US007123375B2

(12) United States Patent
Nobutani et al.

(10) Patent No.: US 7,123,375 B2
(45) Date of Patent: Oct. 17, 2006

(54) PRINTER, POS SYSTEM, WIRELESS COMMUNICATION CONTROL METHOD, AND DATA STORAGE MEDIUM

(75) Inventors: Tsutomu Nobutani, Nagano-ken (JP); Masaki Hoshina, Suwa (JP); Tamotsu Kimura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 871 days.

(21) Appl. No.: 10/118,150

(22) Filed: Apr. 8, 2002

(65) Prior Publication Data

US 2002/0159090 A1 Oct. 31, 2002

(30) Foreign Application Priority Data

Apr. 10, 2001 (JP) ............................. 2001-111803

(51) Int. Cl.
G06F 3/12 (2006.01)
(52) U.S. Cl. ..................................... 358/1.15; 358/1.13
(58) Field of Classification Search ................. 358/1.2, 358/1.12, 1.13, 1.14, 1.15, 1.1, 1.5
See application file for complete search history.

(56) References Cited

U.S. PATENT DOCUMENTS

| 4,502,120 | A | | 2/1985 | Ohnishi et al. |
| 5,253,345 | A | | 10/1993 | Fernandes et al. |
| 5,870,716 | A | * | 2/1999 | Sugiyama et al. ............ 705/26 |
| 5,895,452 | A | | 4/1999 | Lum |
| 5,969,324 | A | * | 10/1999 | Reber et al. ........... 235/462.13 |
| 6,129,274 | A | * | 10/2000 | Suzuki ......................... 235/381 |
| 6,654,378 | B1 | * | 11/2003 | Mahany et al. ............. 370/401 |
| 6,687,679 | B1 | * | 2/2004 | Van Luchene et al. ....... 705/14 |

FOREIGN PATENT DOCUMENTS

| EP | 0 809 174 | 11/1997 |
| EP | 0 893 789 | 1/1999 |
| EP | 0 930 590 | 7/1999 |
| EP | 1 018 714 | 7/2000 |
| JP | 6-12499 | 1/1994 |
| JP | 6-250775 | 9/1994 |
| JP | 7-175613 | 7/1995 |
| JP | 7-186464 | 7/1995 |
| JP | 8-212463 | 8/1996 |
| JP | 9-64899 | 3/1997 |

* cited by examiner

Primary Examiner—Dov Popovici

(57) ABSTRACT

A printer having a physical connection port and a wireless communication module for sending and receiving data by wireless communication, a received data processor controlling the received data, and a printing mechanism for running a printing process is provided, as is a POS system having such a printer, a wireless communication control method, and a computer readable medium carrying a program for implementing the method. A virtual port emulator on a host system receives display output requests from a POS application running on the host, finds data for a wired connection port on a printer of a stand-alone system linked to the virtual port for the display data, and sends the display data with the connection port data through a physical port on the host to a printer of the host system. Data received by the host printer is then allocated by a first received data processor and sent by wireless communication through a wireless communication device of the host to the stand-alone system printer. The wirelessly transmitted data received through a wireless communication device of the stand-alone system is then distributed by a second received data processor to a display of the stand-alone system through a wired connection port. That display then displays the received information, that is, the display data from the POS application.

13 Claims, 10 Drawing Sheets

PRINTER, POS SYSTEM, WIRELESS COMMUNICATION CONTROL METHOD, AND DATA STORAGE MEDIUM

BACKGROUND OF THE INVENTION

1. Field of the Invention

The present invention relates generally to a printer, a POS system, a wireless communication control method, and a data storage medium on which a program for the control method is carried. The invention relates more particularly to a printer having a wired connection port, a wireless communication device for sending and receiving data by wireless communication, a received data processing unit for controlling received data, and a print processing mechanism for running a printing process.

2. Description of the Related Art

Multiple POS terminals each comprising a host controller, input device, display device, and printer for printing receipts for purchased products and product order forms are typically connected via a LAN (local area network) or other wired or wireless network architecture to create a POS system. Once a POS system is assembled it can be reconfigured to create an even better POS system as needs and conditions change.

Reconfiguring a POS system, that is, changing the configuration of components in a POS system, is, however, not easy, and changing the configuration of a deployed system already in use is even more difficult. A POS system can be initially built as an extensible system so that the system configuration can later be changed, anticipating the need for additional POS terminals and the configuration of the POS terminals. However, assuring the ability to reconfigure the POS system creates such problems as wasted installation space and requiring more time to develop and build the system. Furthermore, adding a new POS terminal to a POS system requires temporarily shutting down the entire system and changing the LAN or other network connections. Modifying a system is therefore both time consuming and costly.

Incorporating a wireless communication device in the host controller of the POS terminal so that wireless communication can be used instead of a physical connection to the network (LAN) is one potential solution, but the added wireless communication device then occupies a physical port. This also requires either modifying the host controller to incorporate the wireless communication device or replacing the host controller with a host controller having a wireless communication module. A problem with this is that it is also necessary to change the host controller software or make other system-wide changes. Further time and money is therefore also needed to make such system-wide changes.

Yet another problem is that communication performance varies with the location of the antenna of the wireless communication device, and finding the ideal antenna location is not easy.

SUMMARY OF THE INVENTION

The present invention is directed to a solution for the above problems. Accordingly, an object of the invention is to provide a printer, which is preferably part of a POS system, the printer having a wired connection port, a wireless communication device for sending and receiving data by wireless communication, a received data processing unit for controlling the allocation of received data, and a print processing mechanism for running a printing process.

In accordance with features of the invention, when a POS system is reconfigured using wireless communication, there is no need to change the configuration of the host controller of the existing POS terminal system. An additional printer having a wireless communication module can be included in addition to, or replacement of, the existing printer that is physically connected to the host controller of the existing POS terminal system. Furthermore, by providing the add-on POS terminal system with a printer having its own wireless communication module, control requests from the host controller of the existing POS terminal system can be run in the add-on POS terminal system. It is therefore not necessary to use a new host controller to build the add-on POS terminal system; the existing host controller can be used.

The effects of noise can also be reduced by passing wiring for the antenna of the wireless communication module inside the metal support pillar of the POS terminal system display device, and locating the antenna on top of the display device, on the support pillar, or other high location less affected by obstructions. The best location for the antenna of the wireless communication module can also be easily found by displaying the communication status of the wireless communication module on the display device.

To achieve the above objects, one aspect of the invention provides a printer that has an input/output unit (e.g., a physical connection port) for physically connecting the printer to a host device (e.g., a host controller); a wireless communication unit for wirelessly communicating data with an externally-located wireless communication device; a received data processing unit for processing data received through the physical connection port and through the wireless communication unit; and a printing mechanism for printing data. The received data processing unit includes a data allocation control unit for allocating received data, in accordance with destination information included in the received data, to the externally-located wireless communication device through the wireless communication unit, or to the printing mechanism.

Such a printer may also have a second input/output unit (e.g., a second wired connection port) not connected to the host controller but connected to another external device, wherein the data allocation control unit can allocate data to be sent to through that second wired connection port to the connected external device, when the destination information so indicates.

In addition to having a wired connection port not connected to the host controller, the printer may be in wireless communication with another printer to which the externally-located wireless communication device is connected. A third wired connection port not physically connected to a host controller may be connected to the other printer, which also has a second received data processing unit controlling data received through the third wired connection port or the other printer's (second) wireless communication unit, and a second printing mechanism for running a printing process. This third wired connection port can be physically connected to an input device for inputting data and/or a display device for displaying data.

The second received data processing unit may also have a data allocation control unit for determining, based on the connection data for the destination of the received data and predefined connection data for one or multiple controlled devices, whether the received data is for output to the second wireless communication unit, data, for transfer to the third wired connection port, or for output to the printing mechanism.

Wiring for an antenna of the second wireless communication unit preferably passes inside a metal pillar supporting the display device physically connected through a wired connection port, and disposes the antenna for the second wireless communication unit on top of the display device or on the pillar.

The second received data processing unit obtains communication status information for the second wireless communication unit and generates display data for display on the display device connected through a wired connection port. The display device can display communication status information for the second wireless communication unit received from the received data processing unit through a wired connection port.

In accordance with another aspect of the invention, a POS system having first and second POS terminal is provided. The first POS terminal has a host controller for performing functions of one or more POS application programs, and a printer connected to the host controller through a wired connection port and controlled by the host controller. The second POS terminal has a separate printer and is controlled by wireless communication from the host controller.

In such a POS system, the wireless communication distance between the first and second POS terminals is preferably approximately ten meters or less.

In such a POS system, the host controller may have a virtual port emulation unit for finding connection data for a virtual port wirelessly connected to a device operated by control request from the POS application program based on predefined connection data for one or multiple controlled devices, and generating transmission data based on the connection data found for the virtual port and a control request from the POS application program(s).

A variation of the POS system comprises a master POS terminal including a host controller for executing one or more POS application programs and a master printer to be controlled by and physically connected to the host controller by way of a first input/output unit. The master printer has a master wireless communication unit, a master printing unit, and a master data switch unit. This POS system also includes a slave POS terminal including a slave printer having a slave wireless communication unit and a slave printing unit. The master printer and the slave printer are adapted to allow control of the slave printer by the host controller through wireless communication via the master printer, and the master data switch unit is adapted to direct data received from the host controller to the master wireless communication unit or to the master printing unit in response to the destination data attached to the received data.

According to another aspect of the invention, there is provided a wireless communication control method. The method includes (a) receiving transmission data from an input device, via wireless communication, in response to a request from a POS application program running on a host controller; (b) determining a first destination to send the transmission data based on predefined connection data in the transmission data; (c) sending the transmission data to the first destination; (d) determining a second destination to send the transmission data based on the predefined connection data in the transmission data; and (e) sending the transmission data to the second destination.

In such a method, the first destination may be a printer physically connected to the input device and the second destination may be a component of a host system in wireless communication with the input device and the printer.

In such a method, the second destination is preferably one of a display device for displaying information, a wireless communication module, a printing mechanism, or a host controller.

In such a method the determining or data allocation step(s) may include obtaining communication status information for a wireless communication module physically connected to the display device through a wired connection port; and generating transmission data for presenting the obtained communication status information for the wireless communication module on the display device.

Such a method may further comprise searching connection data predefined for one of multiple devices for connection data for a virtual port wirelessly connecting the input device controlled by request from the POS application program; and generating transmission data based on the connection data found for the virtual port and a control request from the POS application program.

The above-described method or one or more steps thereof may be implemented by a computer program carried on a data storage medium or computer-readable medium. This data storage (computer-readable) medium is preferably a compact disc, floppy disk, hard disk, magneto-optical disc, digital versatile disc (DVD), magnetic tape, or a memory card. This medium may also be a carrier wave or other electromagnetic signal.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 10(*b*) shows a secondary interface board according to the present invention connected to an alternative POS printer.

DESCRIPTION OF THE PREFERRED EMBODIMENTS

A preferred embodiment of the present invention is described below with reference to the accompanying figures. It will be noted that the following embodiments are shown by way of description only and are not intended to limit the scope of the invention. It will be apparent to one skilled in the art in light of the following description that alternative embodiments can be achieved by replacing some or all of the elements described below with equivalent elements. All such variations are included in the scope of this invention.

Figure 1:
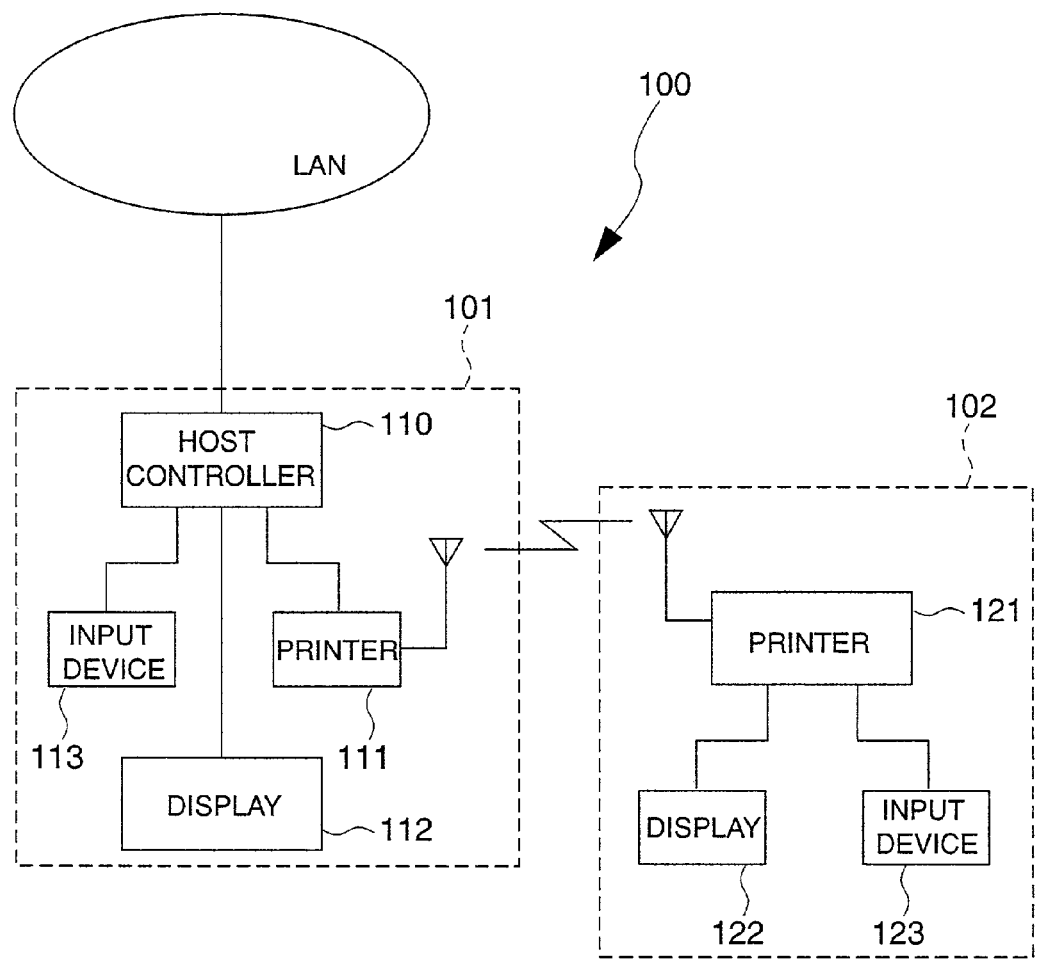
FIG. 1 is a schematic diagram showing a typical POS system configuration.

FIG. 1 shows a typical POS system configuration. A POS terminal system typically has a host controller for running transaction processes and other POS application software, a printer for printing receipts and other documents, a display for displaying product price information, and input devices such as a keyboard and scanner. The various components are connected via wires or cables. Multiple POS terminals are connected in a LAN or other network via wired or wireless connection. The POS terminal system could be a host system of which the host controller is one component, or a stand-alone system in which the host controller is not a component.

In POS system 100 shown in FIG. 1 a host system 101 is connected by a wire to the LAN and a stand-alone system 102 is in wireless communication with the host system. The host system 101 includes a printer 111 equipped with a wireless communication device, a display 112, and an input device 113, each physically connected to a host controller 110.

The stand-alone system 102 has a display 122 and an input device 123, each physically connected to a printer 121 which has a wireless communication device for carrying out wireless communication with the host system 101. Based on control instructions from the application program of the host controller 110, the printer 121 of the stand-alone system 102 can be controlled and information can be displayed on the display 122 using the wireless communication devices of the two printers. Information input from the input device 123 can also be sent to the host controller 110 of the host system 101 using the wireless communication devices.

A POS system according to the present invention has a first POS terminal system and a second POS terminal system. The first POS terminal system has a host controller for performing the functions of one or multiple POS application software programs, and a printer controlled by the host controller to which the printer is connected through a wired (physical) connection port. The second POS terminal system has its own printer which is separate from, but in wireless communication with, the printer physically connected to the host controller of the first POS terminal system.

The operation of the host system and stand-alone system in the POS system shown in FIG. 1 is described below with reference to FIGS. 2–4.

Figure 2:
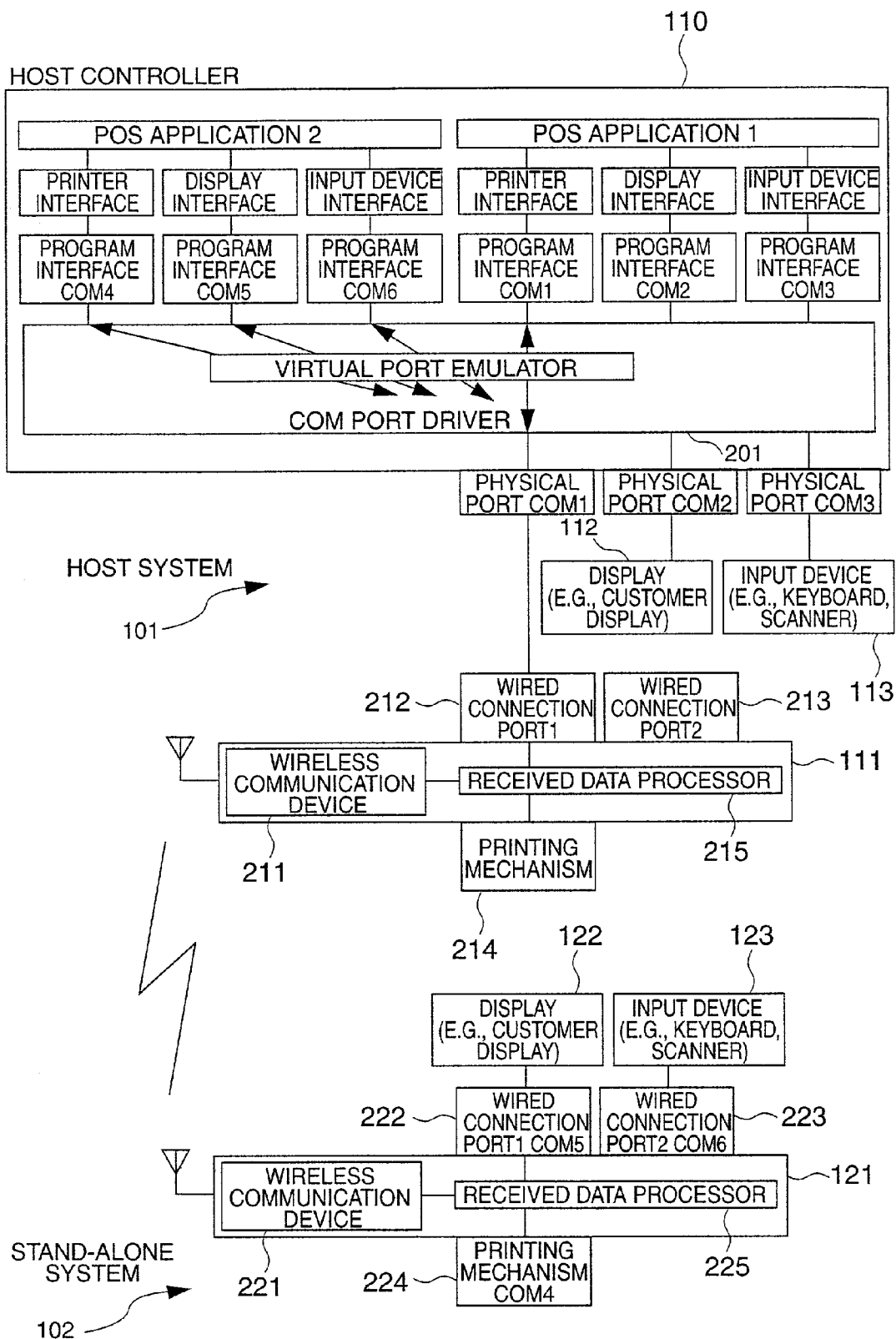
FIG. 2 is a functional block diagram of the host system and a stand-alone system.

FIG. 2 is a functional block diagram of the host system and stand-alone system shown in FIG. 1. Outputting display data on the display 122 of the stand-alone system 102 based on control instructions from POS application 2, a software application run on the host controller 110 of the host system 101, is described below by way of example. The connection port of the display 122 specified by the POS application 2 is assumed below to be COM5, which is not one of the physical connection ports of the host controller 110. This type of non-physical port is referred to below as a "virtual port." The connection port provided in the printer 121 is a wired connection port.

The printer 111 has a wireless communication device 211, a wired connection port 212 for connecting to the host controller 110, a wired connection port 213, and a printing mechanism 214 for performing printing operations. A received data processor 215 of printer 111 runs a process to allocate received data for output to the wireless communication device 211, wired connection port 212 or 213, or printing mechanism 214.

The stand-alone system 102 has a printer 121, a display 122, and an input device 123. The printer 121 has a wireless communication device 221, a wired connection port 222 for connection to the display 122, a wired connection port 223 for connection to the input device 123, and a printing mechanism 224 for running a printing process. A received data processor 225 of printer 121 runs a process to allocate received data for output to the wireless communication device 221, wired connection port 222 or 223, or printing mechanism 224.

When the virtual port emulator 201 receives a display output request for display data from the POS application 2, it finds information for the wired connection port 222 of the printer 121 in the stand-alone system 102 linked to the virtual port COM5, adds the found information to the display data, and sends the resulting display data stream through physical port COM1 to the printer 111.

The digital data received through the wired connection port 212 of printer 111 is then sent by wireless transmission from wireless communication device 211 to wireless communication device 221, the output destination selected by the received data processor 215. The display data received by wireless transmission through the wireless communication device 221 of printer 121 is then passed through wired connection port 222 to the display 122 selected for output by the received data processor 225. The display 122 then presents the received data, that is, the display data from the POS application 2. Thus, the stand-alone system can be controlled by the host controller of the host system using wireless communication devices, which in this example are respectively connected to the printers of the systems.

Figure 3:
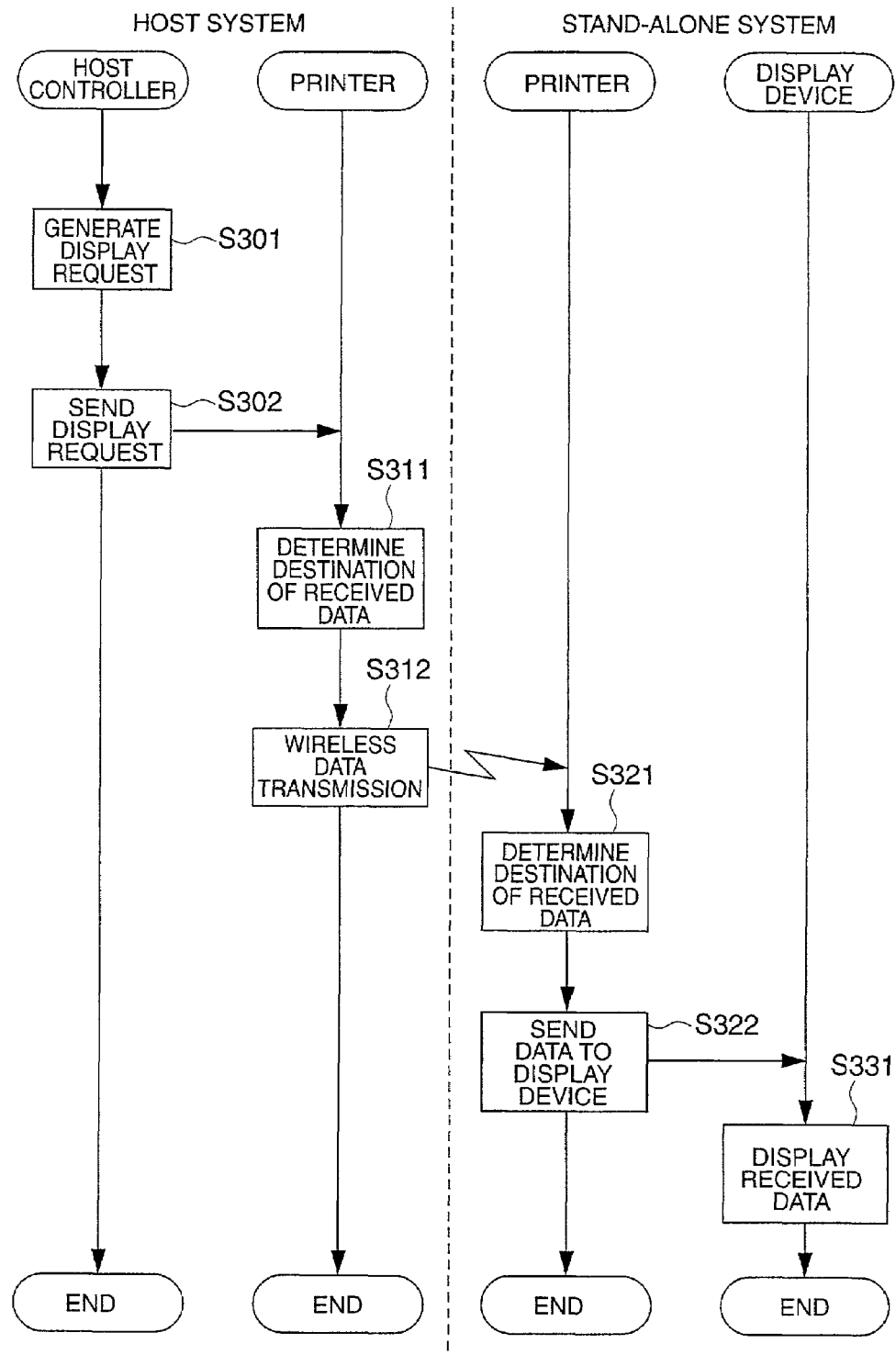
FIG. 3 is a flow chart of a display process whereby the host controller of the host system displays information on the display device of a stand-alone system.

FIG. 3 is a flow chart describing the display process enabling the host controller of a host system to present information on the display device of a stand-alone system. An operation involving the sending of a display process instruction from the POS application 2 running on the host controller 110 to the display 122 is described below by way of example.

The POS application 2 of the host controller 110 first generates the information for display (the display data) on the display 122 (S301), and then sends a display request to the host system printer 111 for sending the display data to the display 122 of the stand-alone system 102 (S302).

The received data processor 215 of the printer 111 then determines where to send the request (the destination) based on the connection data of the received data and connection data preset for each control device (S311). The display data is then sent wirelessly to printer 121 via the selected destination, that is, wireless communication device 211 (S312).

The received data processor 225 of stand-alone system printer 121 then determines where to send the received data based on the connection data in the received data and the connection data preset for each control device (S321). The display data is then sent to the display 122, that is, the destination device identified by the received data processor 225 (S322).

The display 122 then presents the display data based on the received information (S331).

Figure 4:
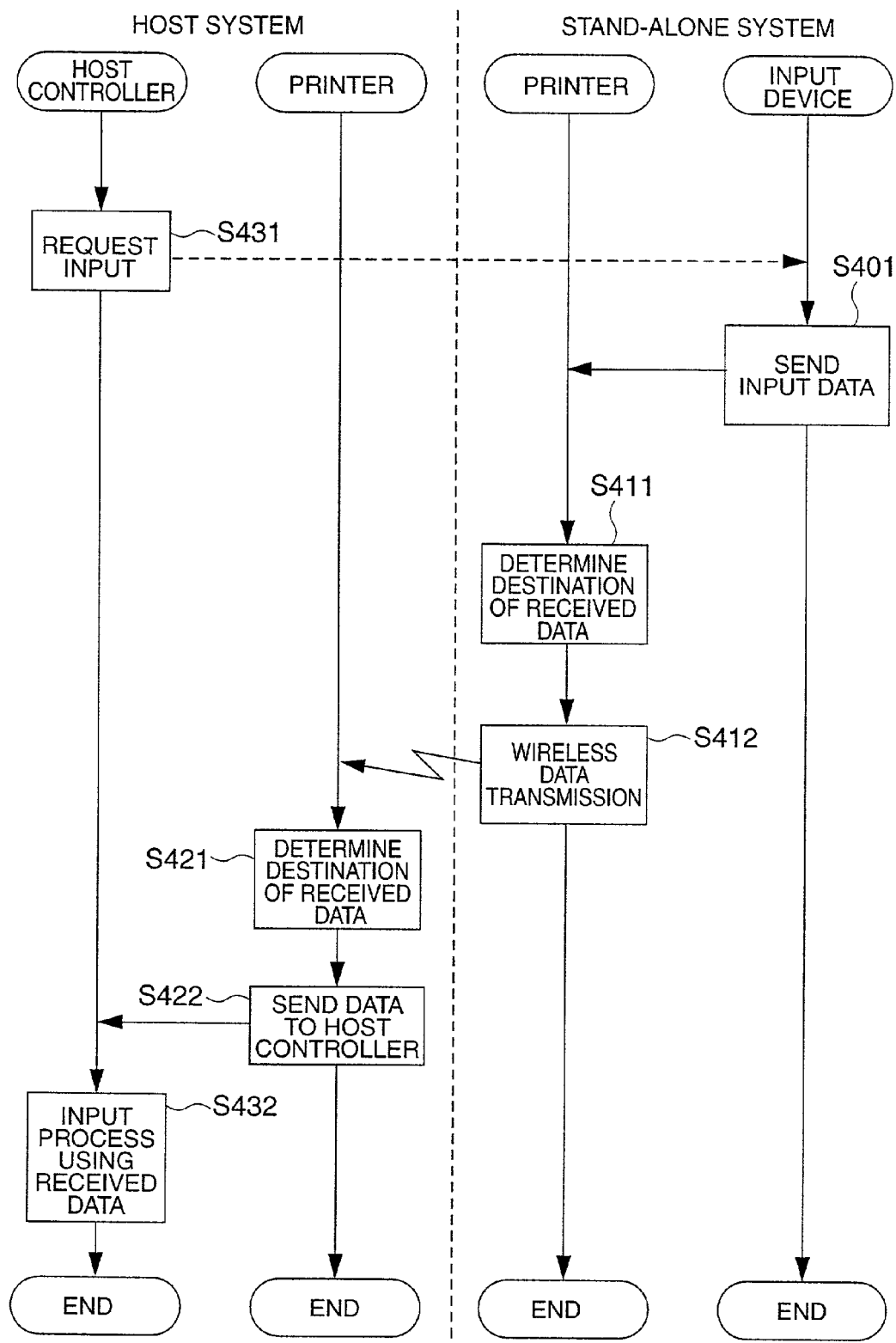
FIG. 4 is a flow chart of an input process for inputting from the input device of the stand-alone system to the host controller.

FIG. 4 is a flow chart of the input process for inputting data from an input device of the stand-alone system to the host controller. Running a transaction process using the POS application 2 of the host controller 110 based on data input from the input device 123 is described below by way of example.

An input process request to the stand-alone system input device 123 is asserted by the POS application 2 run on the host controller 110 as shown in FIG. 4 (S431).

Input data for the POS application 2 of host controller 110 is then input using the input device 123 and sent by way of the stand-alone system printer 121 to the host controller 110 (S401).

The received data processor 225 of printer 121 then determines where to send the received data based on the connection data in the received data and the connection data preset for each control device (S411). The input data is then sent to the host system printer 111 through wireless communication device 221, that is, the destination device identified by the received data processor 225 (S412).

The received data processor 215 of printer 111 then determines where to send the data based on the connection data of the received data and connection data preset for each control device (S421). The input data is then sent to the host controller 110 via the selected destination, that is, the wired connection port 212, identified by the received data processor 215 (S422).

Figure 5:
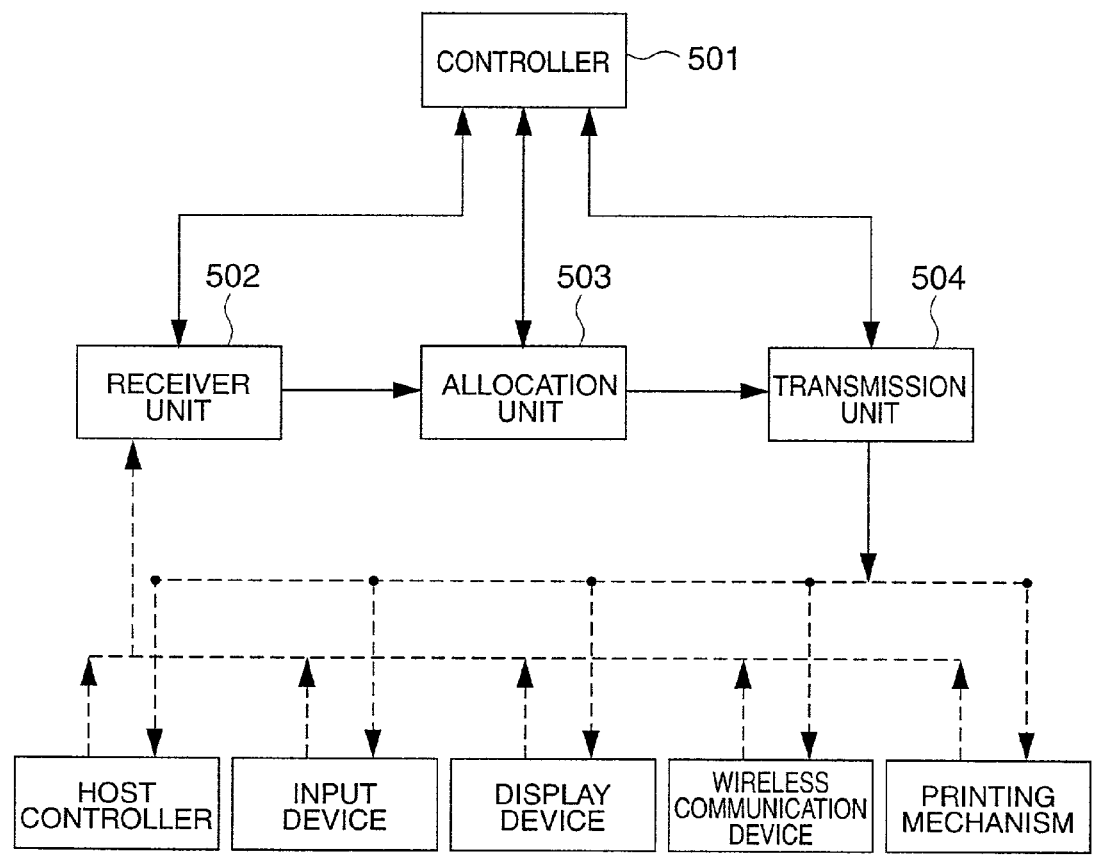
FIG. 5 is a functional block diagram of the received data processing unit of the printer.

The received data processing unit in a printer according to the present invention is described next with reference to FIG. 5 and FIG. 6. As shown in the functional block diagram of FIG. 5, the received data processing unit of this printer has a controller 501, a receiver unit 502, an allocation unit 503, and a transmission unit 504.

The physically connected wireless communication device of the received data processing unit receives data by wireless communication from another wireless communication device, receives data from the host controller passed through a wired connection port, receives data input by the input device through a wired connection port, and receives information from the wireless communication device about the signal conditions, including signal strength, error rate, and the retransmission request rate.

Based on the destination connection data in the data received by the receiver unit 502 and connection data preset for each control device, the allocation unit 503 determines whether to send the received data to the host controller, input device, display device, wireless communication device, or printing mechanism.

The transmission unit 504 then generates transmission data for sending to the destination identified by the allocation unit 503, and sends the resulting transmission data to the destination.

The controller 501 controls the interaction and operation of the receiver unit 502, allocation unit 503, and transmission unit 504.

Figure 6:
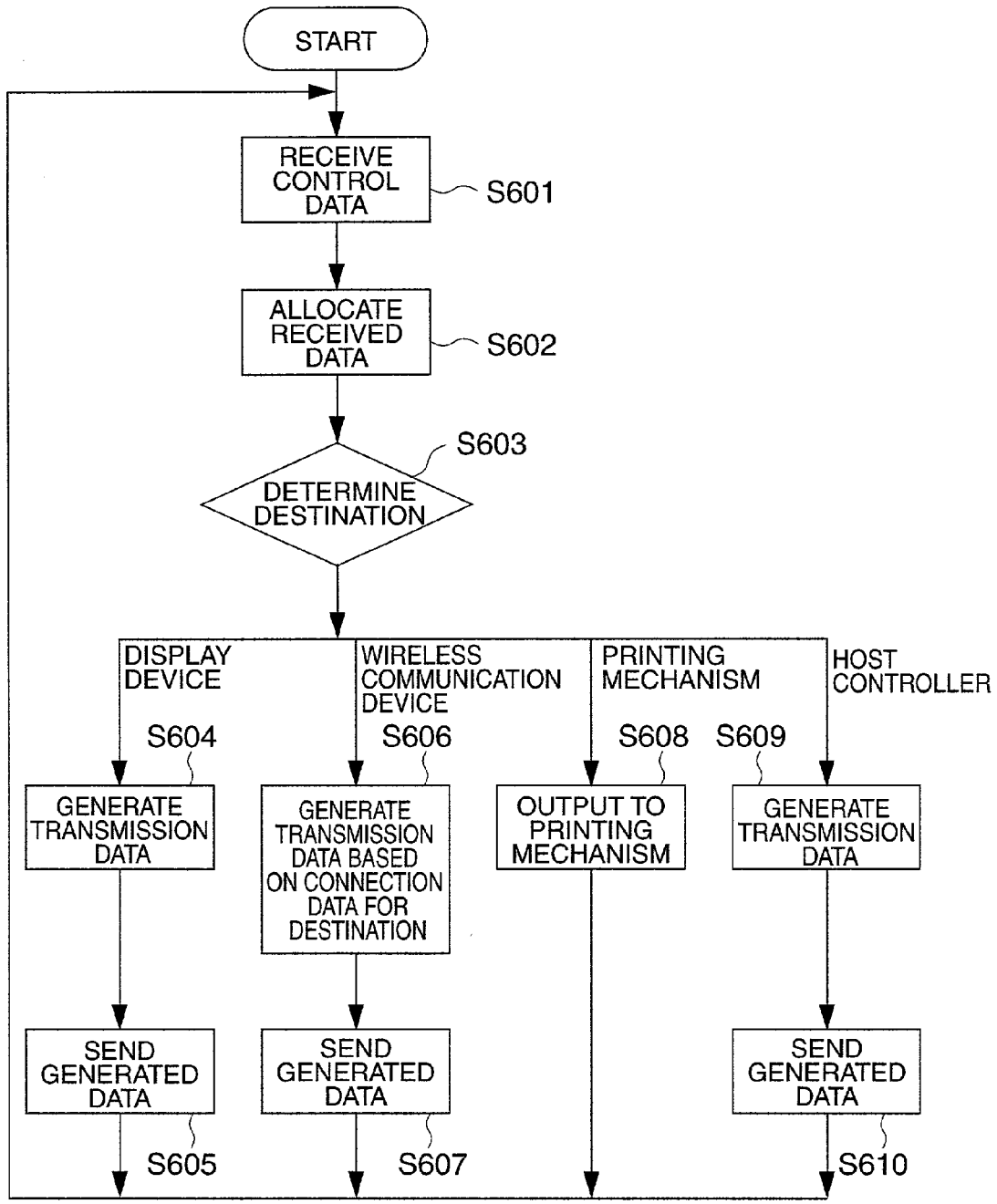
FIG. 6 is a flow chart of a control process of the received data processing unit of the printer.

FIG. 6 is a flow chart of a control process of the received data processing unit of the printer. Data is first received from the wireless communication device, the host controller via the wired connection port, and the input device (S601), and the device to which the received data is allocated next is then determined based on the connection data of the received data and connection data preset for each control device (S602). The device to which the data is allocated by step S602 is then determined (S603).

If the display device is the destination, transmission data to be sent to the display device through the wired connection port is then generated from the received data (S604), and the resulting transmission data is sent to the display device (S605). Control then loops back to step S601 and waits for the next data to be received.

If the wireless communication device is the destination, transmission data containing a destination identifier and control data for transmission through the wireless communication device is then generated from the received data (S606), and the resulting transmission data is sent to the wireless communication device (S607). Control then loops back to step S601 and waits for the next data to be received.

If the printing mechanism is the destination, the received data is output to the printing mechanism (S608). Control then loops back to step S601 and waits for the next data to be received.

If the host controller is the destination, transmission data for transmission through the wired connection port is then generated from the received data (S609) and sent to the host controller (S610). Control then loops back to step S601 and waits for the next data to be received.

The host controller of a POS system according to the present invention has a virtual port emulator. The virtual port emulator finds connection data for a virtual port connected wirelessly to a device controlled by the POS application program based on predefined connection data for one or multiple control devices, and generates transmission data based on the connection data for the located virtual port and the control request from the POS application program.

Figure 7:
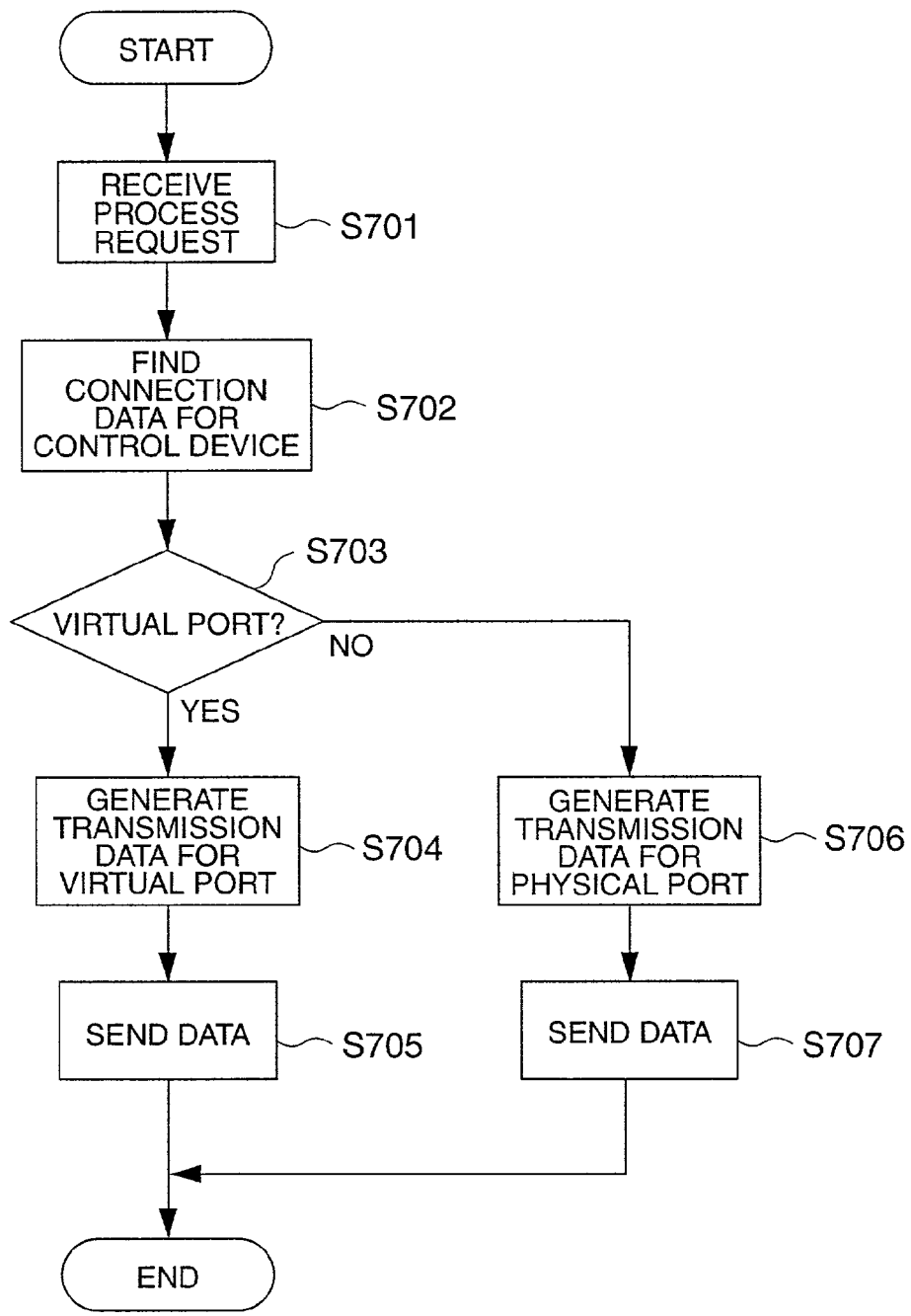
FIG. 7 is a flow chart of a control process of the virtual port emulator of the host controller.

FIG. 7 is a flow chart of the virtual port emulator control process in this host controller. A control process request for the display device or other device is received with control process data from the POS application 2 (S701). Connection information predefined for each control device is then found based on the control device addressed by the received control process request (S702). Whether the connection information points to a virtual port is then determined (S703).

If the connection data is for a virtual port (S703: yes), virtual port transmission data containing the received control process data and the virtual port connection data is generated (S704) and sent to the addressed device through the wired connection port (S705). The process then ends. Note that this virtual port transmission data includes at least virtual port information, device information, input/output data, and the control process data.

If the connection data is for a physical port (S703: no), physical port transmission data containing the received control process data and data for connecting to the physical port is generated (S706) and sent to the device (S707), and then the process ends. Note that this physical port transmission data includes at least physical port information, device information, input/output data, and the control process data.

In a printer according to a preferred embodiment of the invention the antenna wires for the second wireless communication device are passed inside a metal support pillar for supporting the display device, which is physically connected to the wired connection port, and the antenna for the second wireless communication device is disposed on top of the display or on the support column.

The display device of a printer according to the present invention can also display information about the communication status of the second wireless communication device received from the received data processing unit through the wired connection port. Examples of such displays are shown in FIG. 8.

Figure 8:
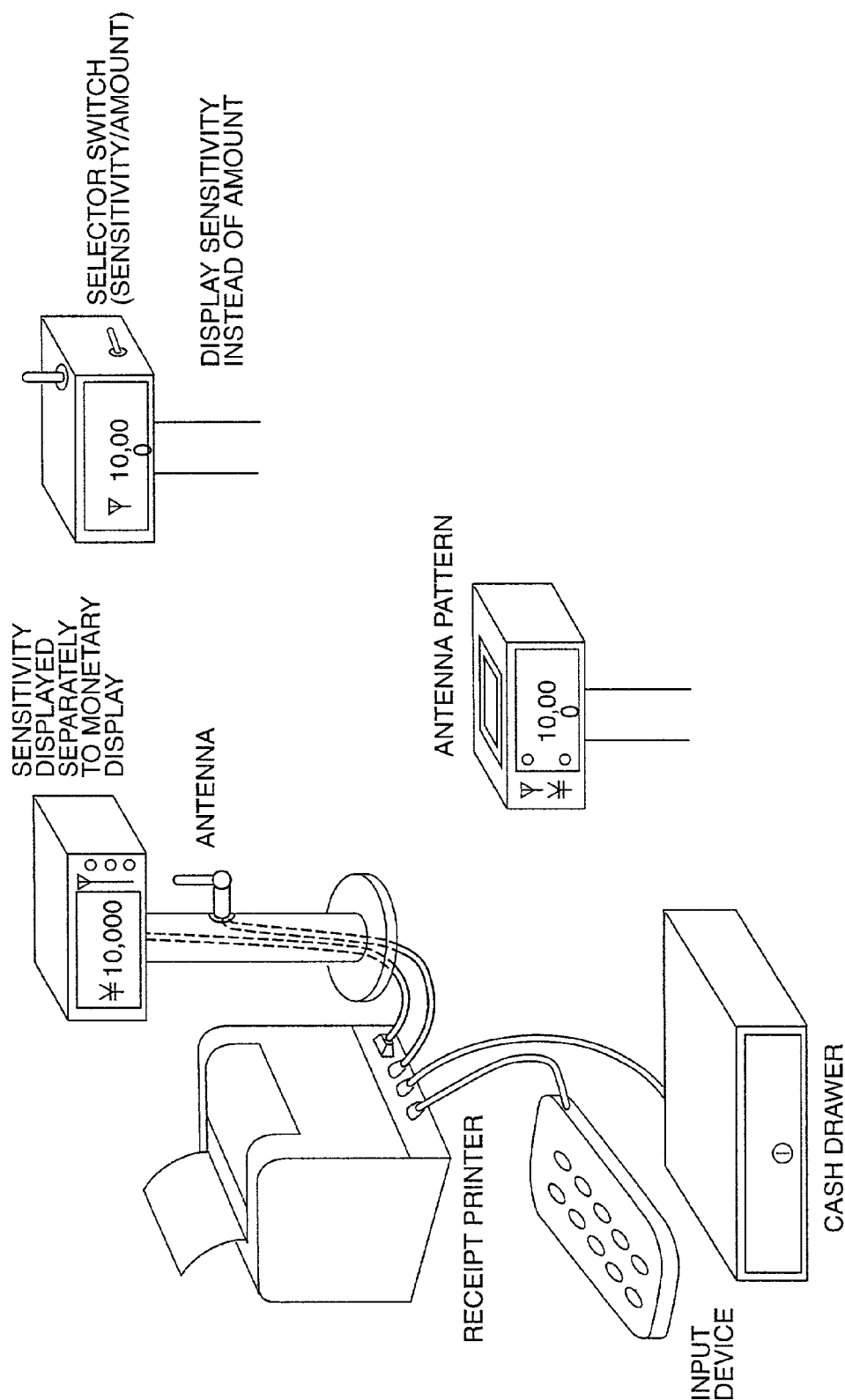
FIG. 8 shows various display devices.

As shown in FIG. 8, such a display device may include a support pillar made of metal. In one embodiment, the antenna wires pass inside the metal pillar and the antenna for the wireless communication device is disposed somewhere on the pillar or on top of the display device. This reduces signal interference with the POS system and improves noise resistance.

A function for displaying information about the communication status of the wireless communication device, such as whether data is being communicated, if a communication link is established, or if communication is interrupted, and information about the strength of the signal received by the wireless communication device, is also preferably provided on the display device. This makes it possible to move the display device in order to find the best reception condition and thereby determine the best location for the wireless communication device antenna.

The received data processing unit of a printer according to the present invention can also obtain information about the communication status of the second wireless communication device and generate display data for presenting information on a display device connected via a wired connection port.

Figure 9:
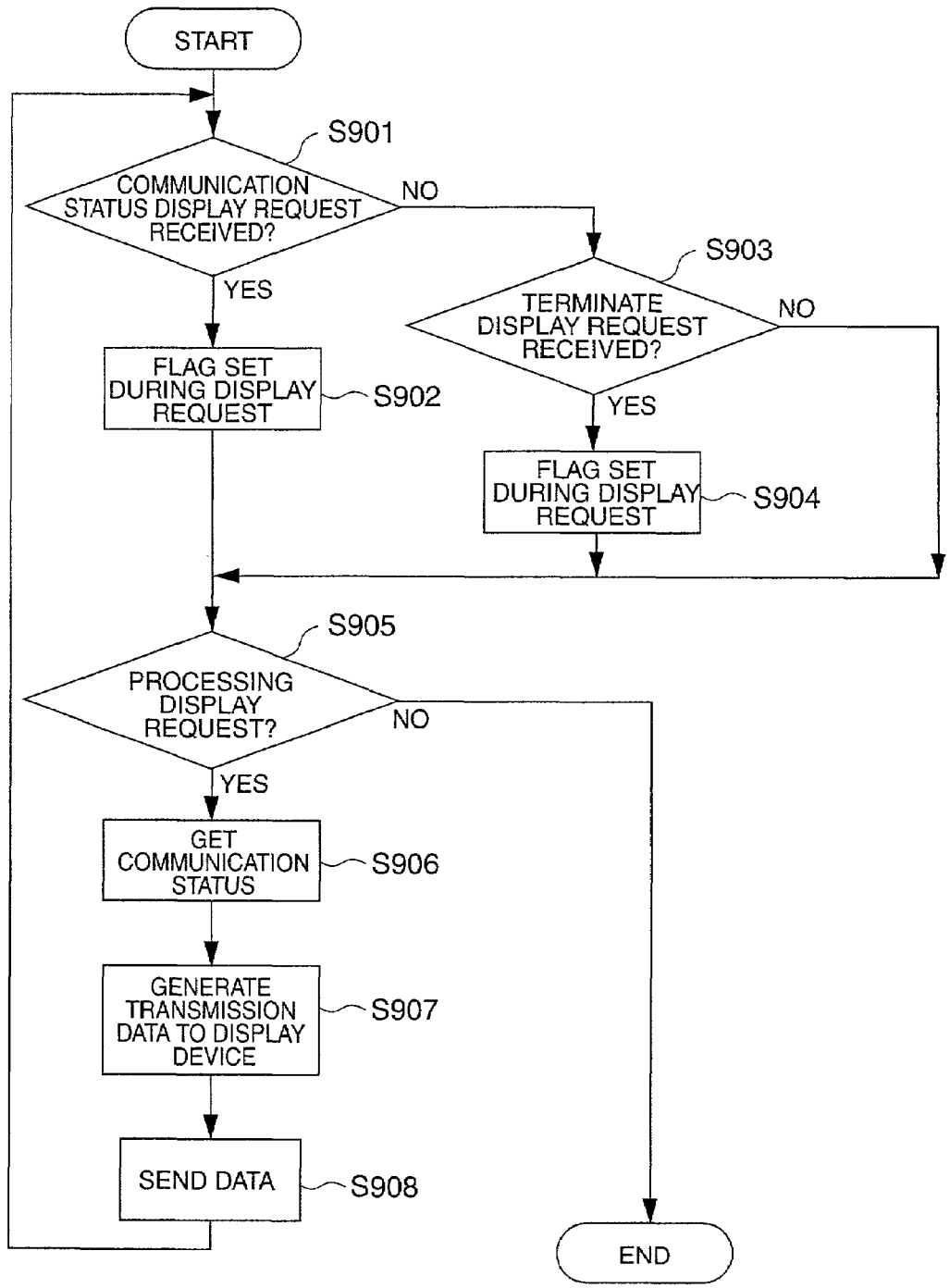
FIG. 9 is a flow chart of the communication state display process in the received data processing function.

FIG. 9 is a flow chart of a communication status display process of the received data processing function. Whether the received data is a request to display the communication status of the wireless communication device is first determined (S901). If it is a request to display the communication status of the wireless communication device (S901: yes), a flag indicating that a communication status display request is being processed is set (S902), and the process advances to step S905. If a request to display the wireless communication device communication status is not received (S901: no), whether the received data is a request to end the wireless communication device communication status display is determined (S903). If it is (S903: yes), the communication status display request flag is reset (S904), and control moves to S905. If the received data is not a request to end the wireless communication device communication status display (S903: no), control moves directly to S905.

Whether displaying wireless communication device communication status information is requested is then determined (S905). If it is (S905: yes), the communication status of the wireless communication device is obtained (S906), and transmission data for sending to the display device is generated based on the detected communication status (S907). The last generated transmission data is then sent through the wired connection port to the display device (S908), and the process thereafter repeats at a certain time interval by returning to step S901. If displaying wireless communication device communication status information is not requested (S905: no), the process ends.

It should be noted that the communication status display process repeats at a specific time interval in the process shown in the flow chart of FIG. 9, but the data can be displayed only when a display process request is received. Furthermore, wireless communication device communication status can be displayed on the display device of the host controller instead of on the local display device, or the communication status data can be output to a display device used only for displaying the communication status.

Thus, a wireless communication control method according to an embodiment of the present invention involves a receiving process for receiving control requests from the POS application program of the host controller and transmission data from a physically connected control device and/or wireless communication device; a data allocation process for determining which control device having a data processing function to send the received transmission data based on the data received from the receiving process and predefined connection data for one or multiple control devices; and a transmission process for sending the received data to the control device identified by the data allocation process.

The data allocation process of the wireless communication control method involves getting communication status data for the wireless communication device, and generating transmission data for presenting the obtained wireless communication device communication status on the display device physically connected to a wired connection port.

Such a wireless communication control method may further involve a process for finding connection data for a virtual port wirelessly connected to a device to which the POS application program issues control requests, and a process for generating transmission data based on the found virtual port connection data and the control request from the POS application program.

A wireless communication control method as described above may be embodied as a computer-executable program on a data storage medium, i.e., computer-readable medium. This computer readable medium may take any of a variety of known forms including compact disc, floppy disk, hard disk, magneto-optical disc, digital versatile disc (DVD), magnetic tape, or memory card. The medium may also be a carrier wave on which such a program is carried.

ALTERNATIVE EMBODIMENTS

Figure 10A:
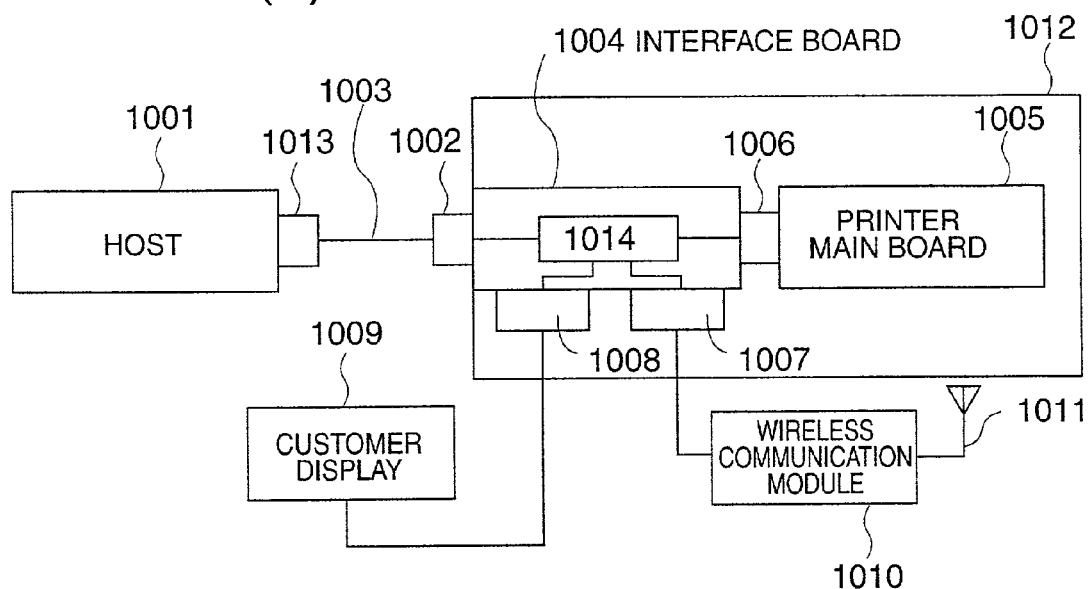
FIG. 10(*a*) shows a main interface board according to the present invention installed in a main POS printer.

FIG. 10(a) shows a main interface board 1004 according to another embodiment the present invention installed in a main POS printer 1012. This interface board 1004 has a wireless communication interface 1007 connected primarily to a wireless communication module 1010, a customer display interface 1008 connected to a customer display 1009 as needed, a printer interface 1006 connected to a main printer board 1005 driving the POS printer 1012, and a host interface 1002 connected by wire 1003 to host computer 1001 through COM port 1013 of the host computer 1001.

Data received from the host computer 1001 is allocated mainly by the allocation unit 1014 based on the destination data for the received data through the host interface 1002 (to the host PC), through the wireless communication interface 1007 (to the wireless communication module), through the printer interface 1006 (to the main printer board 1005 and POS printer 1012), or through the customer display interface 1008 (to the customer display 1009).

Figure 10B:
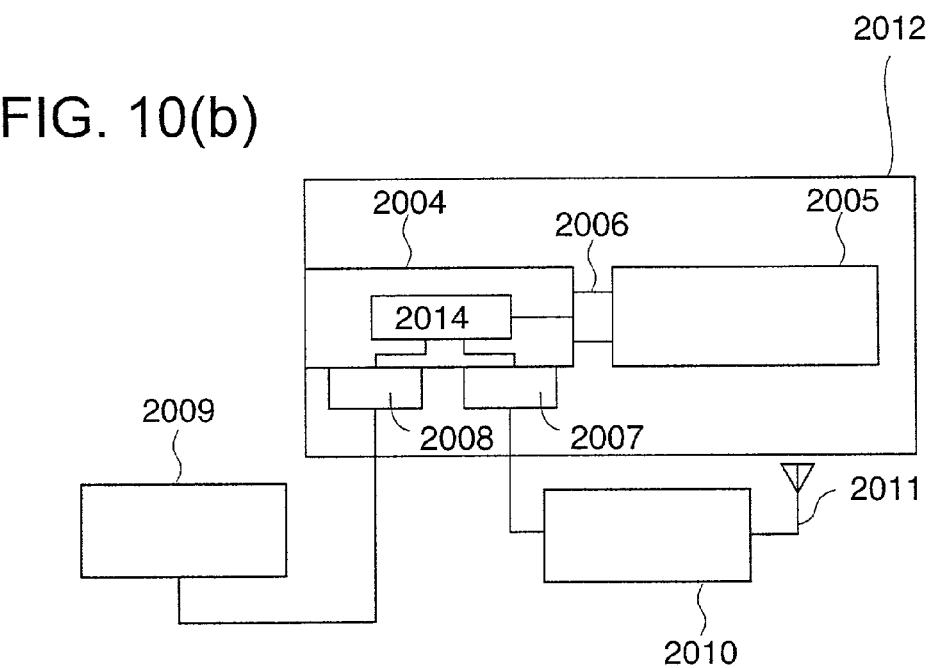

FIG. 10(b) shows a secondary interface board 2004 connected to an alternative POS printer 2012. This secondary interface board 2004 enables wireless communication with the main wireless communication module 1010 through the main antenna 1011 and secondary antenna 2011. Unlike the main interface board 1004 described above, it is not necessary to provide a host interface 1002 for connecting to the host computer 1001.

Data received by the secondary wireless communication module 2010 from the main wireless communication module 1010 is allocated by the secondary allocation unit 2014 based on the destination data for the received data through wireless communication interface 2007 (to the secondary wireless communication module 2010), through the printer interface 2006 (to printer board 2005 and printer 2012), or through the customer display interface 2008 (to the customer display 2009).

By providing multiple secondary POS printers and interface boards as shown in FIG. 10(b), it is possible to add multiple POS printers not requiring a wired connection to the host PC.

As will be understood from the present embodiment of the invention, multiple POS printers 1012 and 2012 can be connected to a single host computer 1001. Furthermore, if one COM port 1013 can be physically connected to a wired connection port of the host computer 1001, multiple POS printers 1012, 2012 can be controlled through an interface board 1004 connected to the COM port even if the number of COM ports on the host computer 1001 is limited and there are not enough physical connections for all of the desired devices.

The multiple POS printers 1012 and 2012 can also be controlled by the wireless communication module 1010 through the interface board 1004 even if the host computer 1001 itself does not have a wireless communication function. This makes it possible to, for example, eliminate the personal computer component of the individual sales registers and use printer registers. The devices connected to the personal computer (such as a bar code reader) can be connected to the interface board 2004. A bar coder reader interface can be provided in the interface board 2004 in order to use the device as a bar code reader. In this case the host PC runs a POS application program compatible with servicing multiple registers. The host PC typically features power data processing capabilities, and can provide a multitask operating environment for serving multiple printer registers.

The printer registers can also be more freely located because they communicate wirelessly.

ADVANTAGES OF THE PRESENT INVENTION

When a POS system is reconfigured using wireless communication, there is no need to change the configuration of the host controller of the existing POS terminal system. An additional printer having a wireless communication module can be included in addition to, or replacement of, the existing printer that is physically connected to the host controller of the existing POS terminal system. Furthermore, by providing the add-on POS terminal system with a printer having its own wireless communication module, control requests from the host controller of the existing POS terminal system can be run in the add-on POS terminal system. It is therefore not necessary to use a new host controller to build the add-on POS terminal system; the existing host controller can be used. With the present invention, it is therefore easy to reconfigure a POS system and also reduce the reconfiguration cost.

Noise interference can also be reduced by disposing the antenna wires of the wireless communication device in the metal support pillar of the POS terminal system display device, and disposing the antenna itself on top of the display device or on the pillar. The best location for the antenna of the wireless communication device, that is, where reception is best, can also be found by further displaying the communication status of the wireless communication device on the display device.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A POS system, comprising:
   a first POS terminal including
      a host controller for performing a function of at least one POS application program;
      an input/output unit; and
      a first printer connected to the host controller through the input/output unit and controlled by the host controller, the first printer having a first wireless communication unit, and a first printing mechanism;
   a second POS terminal including a second printer having a second wireless communication unit in wireless communication with the first wireless communication unit, such that the second POS terminal including the second printer is controlled by the first POS terminal; and
   the host controller comprises a virtual port emulator for finding connection data for a virtual port wirelessly connected to a controlled device operated by a control request from the at least one POS application program based on predefined connection data for the controlled device, and generating transmission data based on the connection data found for the virtual port and a control request from the at least one POS application program.

2. A printer comprising:
   a first input/output unit adapted to be connected to a host device;
   a wireless communication unit;
   a printing mechanism for printing data;
   a received data processing unit for processing data received through the first input/output unit and through the wireless communication unit, wherein the received data includes destination information, the received data processing unit including:
      a data allocation control unit for allocating received data, in accordance with the destination information, to an externally-located wireless communication device through the wireless communication unit, or to the printing mechanism; and
   a second input/output unit physically connected to an external device other than the host device; wherein the data allocation control unit is adapted to output the received data through the second input/output unit to the external device when the destination information of the received data identifies the second input/output unit as the destination.

3. A POS system, comprising:
   a master POS terminal including a host controller for executing one or more POS application programs and a master printer to be controlled by and physically connected to the host controller by way of a first input/output unit, the master printer having a master wireless communication unit, a master printing unit, and a master data switch unit; and
   a slave POS terminal including a slave printer having a slave wireless communication unit and a slave printing unit;
   wherein the master printer and the slave printer are adapted to allow control of the slave printer by the host controller through wireless communication via the master printer, and wherein the master data switch unit is adapted to direct data received from the host controller to the master wireless communication unit or to the master printing unit in response to the destination data attached to the received data.

4. A wireless communication control method for controlling a printer, comprising the steps of:
   (a) receiving transmission data from an input device, via wireless communication, in response to a request from a POS application program running on a host controller;
   (b) determining a first destination to send the transmission data based on predefined connection data in the transmission data;
   (c) sending the transmission data to the first destination, as determined in determining step (b), via wireless communication;

(d) determining a second destination to send the transmission data based on the predefined connection data in the transmission data; and (e) sending the transmission data to the second destination, as determined in determining step (d).

5. A wireless communication control method as recited in claim 4, wherein the first destination is a printer physically connected to the input device and the second destination is a component of a host system in wireless communication with the input device and the printer.

6. A wireless communication control method as recited in claim 4, wherein the second destination is one of a display device for displaying information, a wireless communication module, a printing mechanism, or a host controller.

7. A wireless communication control method as recited in claim 6, wherein the second destination is a display device and one or both of the determining steps comprise:

(1) obtaining communication status information for a wireless communication module physically connected to the display device through a wired connection port; and (2) generating transmission data for presenting the obtained communication status information for the wireless communication module on the display device.

8. A wireless communication control method as recited in claim 4, further comprising the steps of:

(d) searching predefined connection data for one of multiple second destination devices for connection data for a virtual port wirelessly connecting the input device controlled by request from the POS application program; and (e) generating transmission data based on the connection data found for the virtual port and a control request from the POS application program.

9. A computer-readable medium embodying a computer program for executing a wireless communication control method for controlling a printer, the computer program comprising:

(a) instructions for receiving transmission data from an input device, via wireless communication, in response to a request from a POS application program running on a host controller;

(b) instructions for determining a first destination to send the transmission data based on predefined connection data in the transmission data;

(c) instructions for sending the transmission data to the first destination, as determined in (b), via wireless communication;

(d) instructions for determining a second destination to send the transmission data based on the predefined connection data in the transmission data; and (e) instructions for sending the transmission data to the second destination, as determined in (d).

10. A computer-readable medium as recited in claim 9, wherein the first destination is a printer physically connected to the input device and the second destination is a component of a host system in wireless communication with the input device and the printer.

11. A computer-readable medium as recited in claim 9, wherein the second destination is one of a display device for displaying information, a wireless communication module, a printing mechanism, or a host controller.

12. A computer-readable medium as recited in claim 11, wherein the second destination is a display device and one or both of the determining instructions comprise:

(1) instructions for obtaining communication status information for a wireless communication module physically connected to the display device through a wired connection port; and (2) instructions for generating transmission data for presenting the obtained communication status information for the wireless communication module on the display device.

13. A computer-readable medium as recited in claim 9, further comprising:

(d) instructions for searching predefined connection data for one of multiple second destination devices for connection data for a virtual port wirelessly connecting the input device controlled by request from the POS application program; and (e) instructions for generating transmission data based on the connection data found for the virtual port and a control request from the POS application program.

* * * * *